3,819,696
PROCESS FOR THE PRODUCTION OF
TRIALKALI CITRATES
Georg Kominek, Pernhofen, Wulzeshofen, Austria, assignor to Aktiengesellschaft Jungbunzlauer Spiritus- und Chemische Fabrik, Wien, Austria
No Drawing. Filed Feb. 2, 1973, Ser. No. 329,240
Claims priority, application Austria, Feb. 4, 1972, A906/72
Int. Cl. C07c 59/16
U.S. Cl. 260—535 P                    16 Claims

ABSTRACT OF THE DISCLOSURE

Object of the invention is a process for the production of trialkali citrates starting from metal citrates of low solubility. In order to obtain highly concentrated solutions of trialkali citrates the process comprises the steps of adding in order to adjust an alkaline medium an alkali hydroxide to a suspension in water of a metal citrate of low solubility selected from the group consisting of alkaline earth metal citrates and alkaline earth metal-alkali citrates, said suspension having a concentration of 400 to 500 g./l. and then under intensive agitating at a temperature ranging from 40 to 80° C. adding alkali carbonate in solid form to said suspension.

The alkali carbonates employed can be sodium carbonate or potassium carbonate.

---

The present invention relates to a process for the production of trialkali citrates starting from metal citrates. It further relates to processes for the production of sodium citrate and of potassium citrate.

In the production of citric acid by fermentation of carbohydrate-containing media according to conventional, industrially applicable processes, for instance calcium citrate is obtained as an intermediary product in the production of citric acid from a fermentation medium.

It is known to produce alkali citrates by direct neutralization of solutions of citric acid. The requisite condition in this, however, is that the citric acid solution be present in pure form already. This is the only way to make sure that the product obtained by subsequent evaporation (concentration) of the neutralized solution and crystallization of the alkali citrate or, for instance, by spray drying, is of adequate purity and storable.

It is further known that in the production of citric acid, alkali citrates can accrue as intermediary products, by first adding alkali to a citric-acid-containing fermentation solution thickened by evaporation and of higher concentration and then crystallizing part of the alkali citrate, while the rest is precipitated from the mother liquor by means of a calcium salt in the form of monoalkali calcium citrate which can be further processed in the conventional way.

It is further known in the production of alkali citrates to react the alkaline earth metal citrates used as starting products with acids to obtain citric acid and an alkaline earth metal salt of low solubility as a by-product and to react the citric acid solution thus obtained with alkaline solutions to get a solution of the desired alkali citrates, this solution in turn having to be concentrated (evaporated) in order to obtain a crystalline product.

Pertinent literature further describes the reaction of alkali salt solutions, such as, for instance, alkali carbonate solutions, with aqueous suspensions of metal citrates, such as of lead-, zinc-, or calcium citrate. But this reaction yields only diluted citrate solutions.

The disadvantages of all the known processes consist in the fact that in the production of alkali citrates, one must either use very pure solutions of citric acid as starting products, go to great expenditure for evaporating the citric-acid-containing solutions obtained in reaction, or resort to several elaborate and time-consuming process steps such as precipitation, concentration, crystallization and filtration in the processing of these solutions.

It is the object of the invention to provide a process which is free of the disadvantages previously mentioned and by means of which trialkali citrates such as, for instance, trisodium citrate or tripotassium citrate, can be obtained in few process steps in the direct way at an adequate degree of purity and at the same time under favorable process conditions.

According to the invention, this object is achieved in a process of the type initially mentioned in which metal citrates of low solubility are used as starting material, which in order to obtain highly concentrated solutions of trialkali citrates comprises the steps of adding in order to adjust an alkaline medium an alkali hydroxide to a suspension in water of a metal citrate of low solubility selected from the group consisting of alkaline earth metal citrates and alkaline earth metal-alkali citrates, said suspension having a concentration of 400 to 500 g./l. and then under intensive agitating at a temperature ranging from 40 to 80° C. adding alkali carbonate in solid form to said suspension.

A further object of the invention is a process for the production of trisodium citrate which in order to obtain highly concentrated solutions of trisodium citrate comprises the steps of adding in order to adjust an alkaline medium sodium hydroxide to a suspension in water of a metal citrate of low solubility selected from the group consisting of alkaline earth metal and alkaline earth metal-alkali citrates, said suspension having a concentration of 400 to 500 g./l. and then under intensive agitating at a temperature ranging from 40 to 80° C. adding sodium carbonate in solid form to said suspension.

A further object of the invention is a process for producing tripotassium citrate. In order to obtain highly concentrated solutions of this citrate, the same procedure as described above is followed, within the temperature range of 40 to 80° C. and within the same concentration range of alkaline earth metal—or alkaline earth metal—alkali citrates of 400 to 500 g./l. the only difference being that potassium hydroxide is added in order to adjust an alkaline medium and potassium carbonate in solid form is then added to the suspension.

The term "alkaline earth metal-alkali citrates" mentioned above is understood to mean, for instance, citrates representing mixed citrates like (alkaline earth metal-potassium)-, and/or (alkaline earth metal-sodium)- and/or (alkaline earth metal-ammonium)citrates.

The process according to the present invention offers the particular advantage of a direct and immediate production of easily water-soluble trialkali citrates, such as trisodium citrate or tripotassium citrate, from alkaline earth metal- or alkaline earth metal-alkali citrates of low solubility, such as, for instance, from calcium citrate accruing as an intermediary product in the preparation of citric acid from a fermentation medium.

This novel process makes possible, for instance, the production of a trialkali citrate from tricalcium citrate in a degree of purity which can otherwise be achieved in the aforementioned elaborate processing of previously purified, citric-acid-containing fermentation solutions. By direct reaction with soda according to the invention, a highly concentrated solution of trialkali citrate is obtained, optionally permitting direct crystallization of trialkali citrate in foodstuff quality. Alternatively, trialkali citrate in powder form coming up to the conventional technical requirements can be obtained by spray drying. Moreover, the trialkali solution obtained is of such a concentration that subsequent crystallization of the trialkali from the solution is possible without further elaborate concentration by evaporation.

A further advantage of this process consists in the fact that the alkaline earth metal carbonate of low solubility can be practically quantitatively separated from the concentrated trialkali citrate solution by simple filtration, so that a pure solution of the trialkali citrate is obtained which can be easily processed, for instance in the manner previously described.

By the addition of the alkaline base to the reaction mixture in the production of the trialkali citrate, for instance, of a potassium hydroxide solution for the production of tripotassium citrate and a sodium hydroxide solution in the production of trisodium citrate, any formation of hydrogen carbonates or hydrogen citrates in the reaction mixture is prevented. The presence of these substances, on the one hand, leads to the liberation of $CO_2$ and thus to an undesirable shifting of the reaction, for instance, to the undesirable formation of soluble alkaline earth metal carbonates which render impure the trisodium- or tripotassium solution obtained, and, on the other hand, causes undesirable foaming. The quantity of the respective alkali hydroxide to be added is therefore selected so that the unfavorable conditions mentioned above do not occur.

It is practical to select the base used for adjustment of an alkaline medium depending upon which citrate is to be produced, i.e., to use sodium hydroxide for the production of trisodium citrate and potassium hydroxide for the production of tripotassium citrate.

By means of the measure according to the invention to add the carbonates in solid form, it is further possible to avoid the preparation of aqueous solutions of alkali carbonates which are of only fair solubility and can lead to an undesirable lowering of the concentration of the final product.

Although it was to be expected that the reaction of a suspension of alkaline earth metal citrates or alkaline earth metal-alkali citrates which was from the outset pulpy, i.e. highly viscous, with a solid alkali carbonate would lead to pronounced retardations in the reaction course and to technical difficulties in the carrying out of the reaction, it was found that the reaction takes place without any problems in the same way that is usual in the reaction of aqueous solution of the reactants.

The course of the reaction can be expressed by means of the following schematic equation:

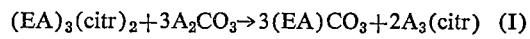

(EA) = alkaline earth metal or alkaline earth metal—alkali, respectively ((for instance: (Ca, Na); (Ca,$NH_4$))
A = alkali (e.g. sodium or potassium)
(citr) = citrate The suspension of an alkaline earth metal citrate preferred for use in each of the processes indicated above is a suspension of calcium citrate.

It is practical to use as the suspension of an alkaline earth metal-alkali citrate in the processes previously mentioned a suspension of a mixed citrate of calcium and sodium or of a mixed citrate of calcium and ammonium; these citrates of calcium or, respectively, the double salts of citric acid of calcium and sodium or calcium and ammonium are obtained, depending upon the process for the production of citric acid by fermentation chosen, after neutralization of the mash.

It has proven to be of particular advantage to employ the solid sodium carbonate or potassium carbonate in calcined form. The use of calcined carbonates has the advantage and is preferred because it prevents the dilution of the respective trialkali citrate solutions obtained by the content of water of crystallization which is normal in commercially available carbonates.

A further favorable embodiment of the process initially described for the production of highly concentrated solutions of trialkali citrates is to carry out the entire process as indicated and then neutralizing the alkali excess, after separation of the alkaline earth metal carbonate of low solubility from the solution, by means of citric acid.

In this way, pure trisodium citrates are obtained upon addition of calcined sodium carbonate and pure potassium citrates are obtained upon addition of calcined potassium carbonate.

The suspensions employed are correspondingly those of, for instance, calcium-sodium citrate, calcium-ammonium citrate or calcium citrate.

The neutralization by means of citric acid as previously described has the advantage that this leads to the production of a substance identical to the product of the process and thus completely prevents a loss of alkali by the formation of by-products.

The temperature range in the reactions according to the invention is, as already indicated, within 40 and 80° C., at intensive stirring in order to accelerate the reaction. Within this temperature range, a fast and smooth reaction of the reactants is secured.

The alkaline earth metal carbonate of low solubility accruing as a by-product in the reaction can be reused for the precipitation of an alkaline earth metal citrate or alkaline earth metal-alkali citrate of low solubility from a diluted citric acid solution, for instance a mash, such as, for instance, of the type accruing in the citric acid fermentation of carbohydrate-containing media, such as by means of a strain of *Aspergillus niger;* said alkaline earth metal citrate of alkaline earth metal-alkali citrate of low solubility can then in turn be converted by means of the process according to the invention to trialkali citrate.

This has the advantage that the alkaline earth metal can be recycled so that in the production of trisodium citrate or tripotassium citrate from a diluted citric acid solution, for instance, from a fermentation mash, the alkaline earth metal carbonate of low solubility accruing from the alkaline earth metal citrate or alkaline earth metal-alkali citrate representing an intermediary product can in turn be reused for the precipitation of citric acid from diluted solutions; this means that the only by-product formed in the process is gaseous carbon dioxide. As a result, there are practically no losses of alkaline earth metal. The carbon dioxide formed is moreover of a high degree of purity and can be utilized.

The invention is explained in detail by means of the following, by no means limiting, examples:

EXAMPLE 1

200 g. moist calcium citrate (corresponding to 100 g. dry substance) are suspended in water in a concentration of 430 g./l., mixed with 0.3 g. sodium hydroxide and then 65 g. calcined soda in solid form are directly added at 60° C. At the end of the reaction, a suspension of calcium carbonate in a trisodium citrate solution of about 44% is obtained. By simple filtration, the sodium citrate solution is separated from the calcium citrate precipitated. The slight excess of sodium ions in the filtrate is neutralized by means of citric acid and the pH value corresponding to the concentration is adjusted by the neutralization so that a 5% aqueous solution has a pH value within the range of 9.7 to 10.3. At the end of the reaction, about 103 g. trisodium citrate are present in a solution with a concentration of about 440 g./l. In cooling off the solution, a major part of the trisodium citrate formed is precipitated in crystalline form, the rest can be processed in the conventional way.

The reaction just described still takes a satisfactory course at a temperature of 45° C.

EXAMPLE 2

Like in Example 1, a suspension of 210 g. calcium ammonium citrate in a concentration of 480 g./l. is mixed with sodium hydroxide and at 70° C., 137 g. calcined soda in solid form are added. Further treatment is effected according to Example 1.

In cooling, a major share of the trisodium citrate present in the solution is obtained in the form of pure crystals.

The reaction practically takes a quantitative course.

EXAMPLE 3

120 g. calcium sodium citrate are suspended in water (concentration of the suspension 460 g./l.), made alkaline with 0.3 g. sodium hydroxide as described in Example 1 and brought to reaction with 50.4 g. solid soda added at a temperature of about 80° C. under vigorous stirring. After separation of the calcium carbonate, the pH value in the filtrate is adjusted with a citric acid solution so that a 5% solution has a pH value between 9.7 and 10.3.

In cooling, the sodium citrate crystallizes in the form of pure crystals. Total yield from the solution is 122 g. trisodium citrate.

EXAMPLE 4

To an aqueous suspension of 100 g. calcium citrate (concentration 435 g./l.) which has been made alkaline with potassium hydroxide in analogy to Example 1, 83.2 g. solid soda are added in batches at a temperature of about 80° C. under vigorous stirring. After separation of the calcium carbonate precipitated, the pH value is adjusted by means of citric acid to a value corresponding to the concentration of the potassium citrate obtained (pH value of about 10.)

After cooling, tripotassium citrate spontaneously crystallizes out.

Total yield from the solution is 121 g. pure potassium citrate.

Processing of the by-product

The moist calcium carbonate obtained in the reactions according to the preceding Examples and washed with water, of a content of about 62.5 g. $CaCO_3$ (dry weight), is added to a citric acid solution of about 15% (containing about 80 g. citric acid) in order to precipitate calcium citrate required for the production of sodium citrate. Precipitation is effected in an acid medium. Decomposition of the calcium carbonate leads to the production of about 14 liters of $CO_2$.

If the calcium carbonate additionally contains sodium citrate, this leads to the formation of corresponding double salts, which do not, however, impede the precipitation. The calcium citrate obtained can in turn be reused in the process according to the invention.

EXAMPLE 5

In analogy to Example 1, the calcium citrate is replaced by the barium salt of citric acid and the soda is replaced by potash (potassium carbonate). To an aqueous suspension of 200 g. barium citrate at a concentration of 500 g./l., first 2 g. KOH are added to adjust an alkaline pH value and then 105 g. solid calcined potash (potassium carbonate) are added at 75° C. under vigorous stirring. At the end of the reaction, the barium carbonate is filtered off and the pH value of the filtrate is adjusted by means of citric acid according to the concentration.

A total yield of tripotassium citrate of 153 g. free of barium is obtained.

I claim:

1. A process for the production of trialkali citrates from metal citrates of low solubility which in order to obtain highly concentrated solutions of trialkali citrates comprises the steps of adding, in order to adjust an alkaline medium, an alkali hydroxide to a suspension in water of a metal citrate of low solubility selected from the group consisting of alkaline earth metal citrates and alkaline earth metal-alkali citrates, said suspension having a concentration of 400 to 500 g./l. and then under intensive agitating at a temperature ranging from 40 to 80° C. adding alkali carbonate in solid form to said suspension.

2. A process for the production of trisodium citrate which in order to obtain highly concentrated solutions of trisodium citrate comprises the steps of adding, in order to adjust an alkaline medium, sodium hydroxide to a suspension in water of a metal citrate of low solubility selected from the group consisting of alkaline earth metal and alkaline earth metal-alkali citrates, said suspension having a concentration of 400 to 500 g./l. and then under intensive agitating at a temperature ranging from 40 to 80° C. adding sodium carbonate in solid form to said suspension.

3. The process claimed in claim 2, wherein said suspension of an alkaline earth metal citrate is a suspension of calcium citrate.

4. The process claimed in claim 2 wherein said suspension of an alkaline earth metal-alkali citrate is a suspension of a mixed citrate of calcium and sodium.

5. The process claimed in claim 2 wherein said suspension of an alkaline earth metal-alkali citrate is a suspension of a mixed citrate of calcium and ammonium.

6. The process claimed in claim 2 wherein said solid sodium carbonate added is calcined soda.

7. A process for the production of tripotassium citrate which in order to obtain highly concentrated solutions of tripotassium citrate comprises the steps of adding in order to obtain an alkaline medium potassium hydroxide to a suspension in water of metal citrates of low solubility selected from the group consisting of alkaline earth metal citrates or alkaline earth metal-alkali citrates, said suspension having a concentration of 400 to 500 g./l. and then under intensive agitating at a temperature ranging from 40 to 80° C. adding potassium carbonate in solid form to said suspension.

8. The process claimed in claim 7 wherein said suspension of an alkaline earth metal citrate is a suspension of calcium citrate.

9. The process claimed in claim 7 wherein said suspension of an alkaline earth metal-alkali citrate is a suspension of a mixed citrate of calcium and sodium.

10. The process claimed in claim 7 wherein said suspension of an alkaline earth metal-alkali citrate is a suspension of a mixed citrate of calcium and ammonium.

11. The process as claimed in claim 7 wherein said solid potassium carbonate is added is calcined potassium carbonate.

12. A process for the production of trialkali citrates from metal citrates of low solubility which in order to obtain highly concentrated solutions of trialkali citrates comprises the steps of adding in order to adjust an alkaline medium an alkali hydroxide to a suspension in water of a metal citrate of low solubility selected from the group consisting of alkaline earth metal citrates and alkaline earth metal-alkali citrates, said suspension having a concentration of 400 to 500 g./l. and then under intensive agitating at a temperature ranging from 40 to 80° C. adding alkali carbonate in solid form to said suspension and after separation of the calcium carbonate obtained neutralizing the excess alkali in the solution of trialkali citrate obtained by means of citric acid.

13. The process claimed in claim 12 wherein the trialkali citrate obtained is sodium citrate and the solid alkali carbonate added is calcined sodium carbonate.

14. The process claimed in claim 12 wherein the trialkali citrate obtained is potassium citrate and the solid alkali carbonate added is calcined potassium carbonate.

15. The process claimed in claim 12 wherein the suspension of alkaline earth metal-alkali citrate is selected of the group of suspensions consisting of suspensions calcium-sodium citrate and calcium-ammonium citrate.

16. The process claimed in claim 12 wherein said suspension of an alkaline earth metal citrate is a suspension of calcium citrate.

References Cited

UNITED STATES PATENTS 2,159,155   5/1939   Holton _____ 260—535 P

LORRAINE A. WEINBERGER, Primary Examiner

P. J. KILLOS, Assistant Examiner